US012606291B2

(12) United States Patent (10) Patent No.: US 12,606,291 B2
Iwata et al. (45) Date of Patent: Apr. 21, 2026

(54) STEERING SYSTEM FOR SHIP AND CONTROL PARAMETER SETTING METHOD

(71) Applicant: SUZUKI MOTOR CORPORATION, Hamamatsu (JP)

(72) Inventors: Satoru Iwata, Hamamatsu (JP); Yuzuru Ito, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 160 days.

(21) Appl. No.: 18/455,046

(22) Filed: Aug. 24, 2023

(65) Prior Publication Data

US 2024/0067323 A1 Feb. 29, 2024

(30) Foreign Application Priority Data

Aug. 29, 2022 (JP) ................................. 2022-136077

(51) Int. Cl.
 *B63H 25/00* (2006.01)
 *B63H 25/04* (2006.01)
 *B63H 25/42* (2006.01)
 *G05D 1/00* (2006.01)
 *B63H 25/02* (2006.01)

(52) U.S. Cl.
 CPC ............. *B63H 25/04* (2013.01); *B63H 25/42* (2013.01); *G05D 1/0208* (2013.01); *B63H 2025/026* (2013.01); *B63H 2025/425* (2013.01)

(58) Field of Classification Search
 CPC .. B63H 25/04; B63H 25/42; B63H 2025/026; B63H 2025/425; G05D 1/0208
 USPC ......................................................... 701/21
 See application file for complete search history.

(56) References Cited

U.S. PATENT DOCUMENTS

| | | | |
|---|---|---|---|
| 8,700,238 B2 | 4/2014 | Hiramatsu | ...................... 701/21 |
| 9,487,283 B2 | 11/2016 | Inoue et al. | ........... B63H 20/12 |
| 2003/0129886 A1* | 7/2003 | Hattori | ................. B63H 21/213 |
| | | | 440/84 |
| 2019/0202541 A1 | 7/2019 | Pettersson | .............. B63H 25/42 |
| 2022/0169352 A1* | 6/2022 | Ikegaya | ................. B63H 25/38 |
| 2022/0266973 A1* | 8/2022 | Sakurada | ............... B63H 20/12 |
| 2022/0306257 A1* | 9/2022 | Afman | ................... B63H 20/12 |
| 2024/0174331 A1* | 5/2024 | Hara | ...................... B63H 25/04 |

FOREIGN PATENT DOCUMENTS

JP 2-227396 A 9/1990

OTHER PUBLICATIONS

Extended European Search Report issued on Feb. 15, 2024 in the corresponding European Patent Application No. 23193257.5.

* cited by examiner

*Primary Examiner* — Mahmoud S Ismail
(74) *Attorney, Agent, or Firm* — Stein IP LLC

(57) ABSTRACT

A steering system (1) is employed in a ship to which left and right propulsors (2L, 2R) are attached. The steering system (1) includes a first input device (11) configured to receive an input of any one of a forward thrust parameter and a reverse thrust parameter of the propulsors, a second input device (15) configured to receive an input of the other of the forward thrust parameter and the reverse thrust parameter of the propulsors, and a controller (17) configured to reflect the forward thrust parameter and the reverse thrust parameter to the propulsors in real time. In the steering system, the first input device and the second input device receive the inputs in parallel when a steering pattern for a ship is set.

14 Claims, 11 Drawing Sheets

*FIG. 2*

| BOAT STEERING PATTERN | CONTROL PARAMETER | | INPUT OPERATION OF GAUGE | BASIC OPERATION OF JOYSTICK | INPUT OPERATION OF JOYSTICK |
|---|---|---|---|---|---|
| TURNING | FORWARD THRUST | INCREASE | UP BUTTON | TWISTING IN TURNING DIRECTION | — |
| | | DECREASE | DOWN BUTTON | | — |
| | REVERSE THRUST | INCREASE | — | | TILTING REARWARD → RETURN |
| | | DECREASE | — | | TILTING FORWARD → RETURN |
| LATERAL MOVEMENT | FORWARD THRUST | INCREASE | UP BUTTON | TILTING IN LEFT-RIGHT DIRECTION | — |
| | | DECREASE | DOWN BUTTON | | — |
| | REVERSE THRUST | INCREASE | — | | TILTING REARWARD → RETURN |
| | | DECREASE | — | | TILTING FORWARD → RETURN |
| | RUDDER ANGLE | INCREASE (OPEN) | — | | TWISTING TO SIDE OPPOSITE TO TILTED SIDE → RETURN |
| | | DECREASE (CLOSE) | — | | TWISTING TO SAME SIDE AS TILTED SIDE → RETURN |

FIG. 6

| BOAT STEERING PATTERN | OPERATION OF JOYSTICK | UPPER LIMIT OUTPUT |
|---|---|---|
| TURNING | TWISTING IN TURNING DIRECTION | LARGE |
| | | SMALL |
| LATERAL MOVEMENT | TILTING IN LEFT-RIGHT DIRECTION | LARGE |
| | | SMALL |

STEERING SYSTEM FOR SHIP AND CONTROL PARAMETER SETTING METHOD

CROSS-REFERENCE TO RELATED APPLICATIONS

The disclosure of Japanese Patent Application No. 2022-136077 filed on Aug. 29, 2022, including specification, drawings and claims is incorporated herein by reference in its entirety.

TECHNICAL FIELD

The present invention relates to a steering system for ship and a control parameter setting method.

BACKGROUND ART

In recent years, a ship steering system using a joystick has been developed in the marine industry (see, for example, JPH02-227396A). In a ship steering system described in JPH02-227396A, propulsion directions and propulsive forces of left and right propulsors are adjusted by a joystick. For example, the joystick is twisted to turn a ship, and the joystick is tilted leftward or rightward to move the ship laterally. In order to operate the ship as expected by operating the joystick, control parameters of the left and right propulsors must be appropriately set at a time of an initial setting. The initial setting of the control parameters is performed by using an electronic device such as a digital gauge for each setting item.

SUMMARY

In an initial setting using an electronic device, when a plurality of control parameters are set, the control parameters are set one by one while switching setting items. Since an action of a ship changes after a first control parameter is set, it is necessary to check the action of the ship after the first control parameter is set when a second control parameter is set. Depending on the action of the ship, the control parameters must be reset.

The present embodiment has been made in view of the above circumstances, and an object thereof is to provide a steering system for a ship and a control parameter setting method capable of reducing a work load of a setting work on a control parameter for an initial setting and shortening a work time.

An aspect of a present embodiment which can solve the above technical problem is a steering system for a ship to which left and right propulsors are attached, including a first input device configured to receive an input of any one of a forward thrust parameter and a reverse thrust parameter of the propulsors, a second input device configured to receive an input of the other of the forward thrust parameter and the reverse thrust parameter of the propulsors, and a controller configured to reflect the forward thrust parameter and the reverse thrust parameter to the propulsors in real time. In the steering system, the first input device and the second input device receive the inputs in parallel when a steering pattern for a ship is set.

According to the steering system for the ship according to the aspect of the present invention, the forward thrust parameter and the reverse thrust parameter are input in parallel by the first and second input devices when the steering pattern is set, and the forward thrust parameter and the reverse thrust parameter are reflected in the propulsors in real time. The forward thrust parameter and the reverse thrust parameter can be simultaneously set while confirming an action of the ship. Therefore, it is possible to reduce work loads of setting works on the forward thrust parameter and the reverse thrust parameter, and shorten work times.

BRIEF DESCRIPTION OF DRAWINGS

FIG. 2 is an allocation table of device operations for each steering pattern in the present embodiment;

FIG. 6 is a thrust setting table for each steering pattern;

DETAILED DESCRIPTION OF EMBODIMENTS

Figure 1:
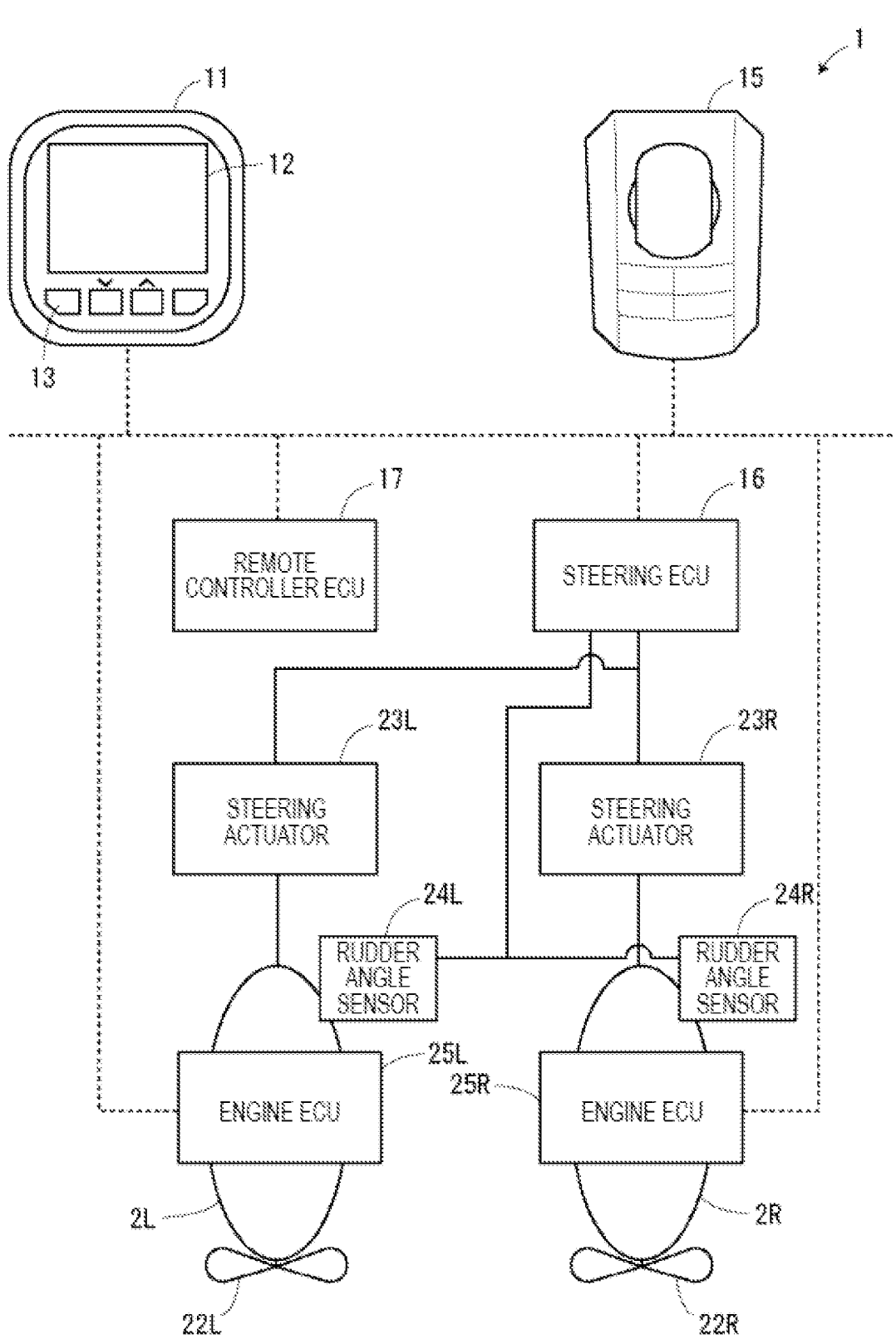
FIG. 1 is a configuration diagram of a steering system for a ship according to the present embodiment.

A steering system for a ship according to an aspect of the present embodiment is employed in a ship to which left and right propulsors are attached. In the steering system, when a steering pattern is set, a first input device receives an input of any one of a forward thrust parameter and a reverse thrust parameter of the propulsors, and a second input device receives an input of the other. The forward thrust parameter and the reverse thrust parameter are input in parallel by the first and second input devices, and the forward thrust parameter and the reverse thrust parameter are reflected in the propulsors in real time by a controller. The forward thrust parameter and the reverse thrust parameter can be simultaneously set while confirming an action of the ship. Therefore, it is possible to reduce a work load of a setting work on the forward thrust parameter and the reverse thrust parameter, and shorten a work time.

Embodiments

In a steering system for a ship using a joystick, it is important to initially set thrust parameters of left and right propulsors so that the joystick can move a ship as desired. Specifically, the thrust parameters must be appropriately set according to a size of the ship, a position of a center of gravity, a shape of a bottom of the ship, output characteristics of the propulsors, a shape of a propeller, and the like. In this case, the steering system is provided with an electronic gauge, and the electronic gauge sets a forward thrust and a reverse thrust of the left and right propulsors. In a single electronic gauge, a setting item for the reverse thrust cannot be called while a setting item for the forward thrust is being called, making a setting work cumbersome.

For example, in a setting of a clockwise turning steering, rudder angles of left and right outboard motors are neutral, the left propulsor outputs the forward thrust, and the right propulsor outputs the reverse thrust. The thrust parameters are set such that the forward thrust and the reverse thrust are balanced with respect to a turning center of a hull. Generally, the propeller of the propulsor is designed to generate a high thrust in a forward direction, and thus, the balance between the forward thrust and the reverse thrust cannot be determined by an engine revolution speed. Unless the forward thrust of the left propulsor is set with the electronic gauge and an action of the hull is confirmed, the reverse thrust of the right propulsor cannot be accurately set with the electronic gauge.

In a setting of a lateral movement steering to a right side, it is necessary to set the rudder angles of the left and right propulsors in addition to setting the thrusts of the left and right propulsors. The rudder angles of the left and right outboard motors open to the left and right in an inverted V shape, the left propulsor outputs the forward thrust, and the right propulsor outputs the reverse thrust. An intersection point of center lines of the left and right propulsors tilted in the inverted V shape is at a center of gravity of the hull, and the thrust parameters are set such that the forward thrust and the reverse thrust are balanced with respect to the center of gravity of the hull. In this case, the rudder angles of the left and right propulsors, the forward thrust of the left propulsor, and the reverse thrust of the right propulsor also must be individually set while the action of the hull is confirmed.

The forward thrust and the reverse thrust with respect to the center of gravity of the hull are changed by changing the rudder angles of the left and right propulsors. When the balance between the left and right thrusts of the propulsor is lost, the thrust balance must be readjusted. The settings of the rudder angles of the left and right propulsors, the forward thrust of the left propulsor, and the reverse thrust of the right propulsor are repeated until the desired lateral movement steering is achieved, and a significant amount of time may be spent on initial settings of the thrust parameters for the left and right propulsors. Therefore, in the steering system according to the present embodiment, in order to reduce a work load of a setting work and shorten a work time, it is possible to simultaneously set the forward thrust and the reverse thrust of the left and right propulsors while confirming the action of the hull.

Figure 3A:
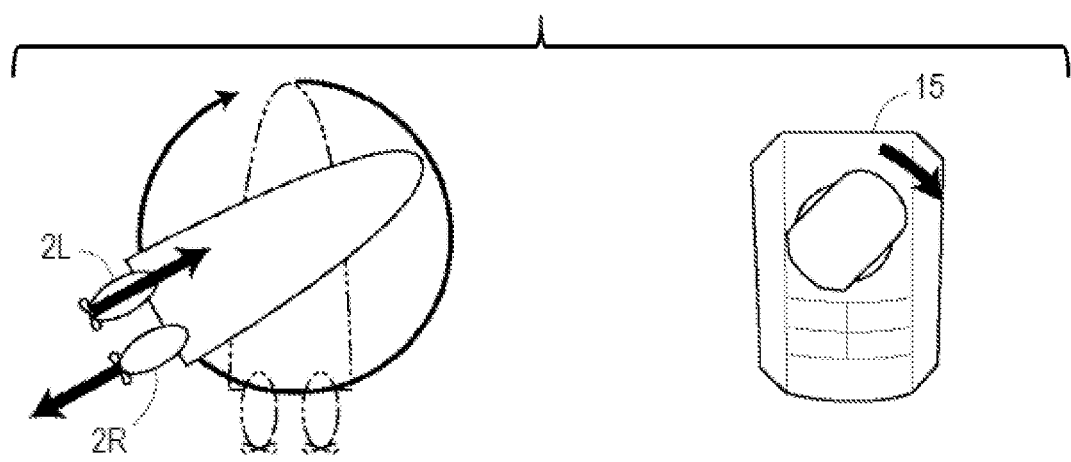
FIGS. 3A, 3B and 3C are diagrams illustrating an initial setting work of a turning steering in the present embodiment.
Figure 3B:
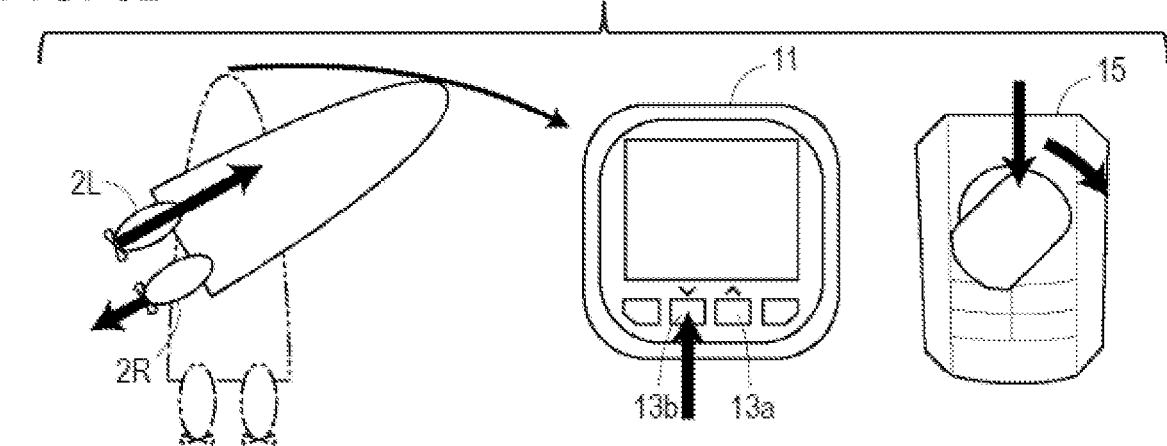
Figure 3C:
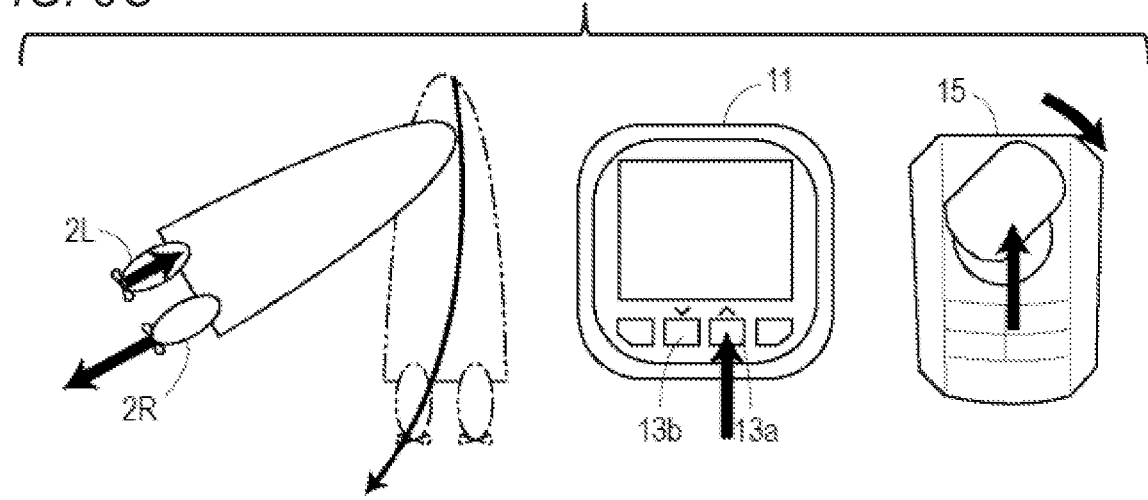

Hereinafter, a steering system for a ship according to the present embodiment will be illustrated with reference to the attached drawings. FIG. 1 is a configuration diagram of the steering system according to the present embodiment. FIG. 2 is an allocation table of device operations for each steering pattern in the present embodiment. FIGS. 3A, 3B and 3C are diagrams illustrating an initial setting work of a turning steering in the present embodiment. FIGS. 4A, 4B and 4C, and FIGS. 5A and 5B are diagrams illustrating an initial setting work of a lateral movement steering in the present embodiment. FIG. 6 is a thrust setting table for each steering pattern.

As shown in FIG. 1, in a steering system 1 for a ship, an electronic gauge 11, a joystick 15, a steering ECU 16, a remote controller ECU 17, and engine ECUs 25L and 25R are communicably connected via a controller area network (CAN). Left and right propulsors 2L and 2R are attached to a rear portion of a hull, and propellers 22L and 22R are rotated by engines of the propulsors 2L and 2R to give a thrust to the hull. Steering actuators 23L and 23R steer the propulsors 2L and 2R leftward and rightward, and rudder angle sensors 24L and 24R detect rudder angles of the propulsors 2L and 2R.

The electronic gauge 11 functions not only as a display device, but also as an input device (first input device) for forward thrust adjustment. Operation buttons 13 are provided below a display 12 of the electronic gauge 11, and the operation buttons 13 of the electronic gauge 11 receive screen switching and mode change of the display 12. In a normal mode, the electronic gauge 11 is used to confirm information necessary for steering of the ship, such as an engine revolution speed, and in a setting mode, the electronic gauge 11 is used to initially set a forward thrust parameter for the propulsors 2L and 2R and to confirm setting information. In the setting mode, an initial setting for the turning steering and an initial setting for the lateral movement steering are performed.

If the electronic gauge 11 switches from the normal mode to the setting mode, a setting mode request signal is transmitted from the electronic gauge 11 to the joystick 15 through CAN, and the joystick 15 also shifts to the setting mode. In this case, the operation buttons 13 of the electronic gauge 11 receive an input of the forward thrust parameter of the propulsors 2L and 2R. The forward thrust parameter is transmitted from the electronic gauge 11 to the joystick 15 through CAN. The display 12 of the electronic gauge 11 may be implemented by a touch panel, and the input of the forward thrust parameter may be received by the touch display.

The joystick 15 functions not only as a steering device for a ship, but also as an input device (second input device) for reverse thrust adjustment and rudder angle adjustment. In the normal mode, the joystick 15 is used to move the hull, and in the setting mode, the joystick 15 is used to initially set a reverse thrust parameter and rudder angle parameters for the propulsors 2L and 2R. The joystick 15 is provided with a joystick controller (not shown), and the joystick controller calculates a rudder angle control signal and a throttle control signal according to an operation position of the joystick 15.

In the normal mode, the rudder angle control signal and the throttle control signal are obtained according to an operation direction and an operation amount of the joystick 15. The rudder angle control signal is transmitted from the joystick 15 to the steering ECU 16 through CAN, and electric power is supplied from the steering ECU 16 to the steering actuators 23L and 23R based on the rudder angle control signal to control rudder angles of the propulsors 2L and 2R. The throttle control signal is transmitted from the joystick 15 to the engine ECUs 25L and 25R through CAN via the remote controller ECU 17, and the engine ECUs 25L and 25R control propulsive forces of the propulsors 2L and 2R based on the throttle control signal.

In the setting mode, the joystick 15 receives a basic operation of the steering pattern. For example, a twisting operation of the joystick 15 is received in a case of the turning steering, and a tilting operation of the joystick 15 in a left-right direction is received in a case of the lateral movement steering. The joystick 15 receives inputs of the reverse thrust parameter and the rudder angle parameters of the propulsors 2L and 2R during the basic operation of the steering pattern. Accordingly, the reverse thrust parameter and the rudder angle parameters can be set during the steering of the ship without removing a hand from the joystick 15. A method for setting each control parameter will be described later.

As described above, the joystick 15 receives the forward thrust parameter from the electronic gauge 11 through CAN. The throttle control signal is obtained from the forward thrust parameter and the reverse thrust parameter and transmitted to the engine ECUs 25L and 25R via the remote controller ECU 17, and the rudder angle control signal is obtained from the rudder angle parameters and transmitted to the steering ECU 16. The thrusts and the rudder angles of the propulsors 2L and 2R are controlled for each steering pattern. Each control parameter of the joystick 15 is also notified to the electronic gauge 11 through CAN, and each control parameter can be confirmed in real time by viewing the display 12 of the electronic gauge 11.

The steering ECU 16 and the remote controller ECU 17 function as controllers that reflect the rudder angle parameters, the forward thrust parameter, and the reverse thrust parameter to the propulsors 2L and 2R in real time. A real-time setting change is possible by communicating each part of the steering system 1 by CAN. In this way, in the setting mode, the electronic gauge 11 and the joystick 15 receive the inputs in parallel when the steering pattern is set. The forward thrust parameter and the reverse thrust parameter are simultaneously set while confirming an action of a ship, so that a work load of a setting work of the steering pattern is reduced and a work time is shortened.

The forward thrust parameter is indicated by a ratio (%) to an upper limit output (maximum thrust) of the propulsors 2L and 2R. The reverse thrust parameter is indicated by a ratio (%) to the upper limit output (maximum thrust) of the propulsors 2L and 2R. The rudder angle parameters are indicated by angles of the propulsors 2L and 2R between a front-rear direction of the hull and propulsion directions of the propulsors 2L and 2R. As the rudder angles widen, the propulsors 2L and 2R are opened outward, and as the rudder angles are narrowed, the propulsors 2L and 2R are closed inward. Although the details will be described later, in the setting mode, the upper limit output of the propulsors 2L and 2R can be set in two stages, large and small.

Processing of each part of the steering system 1 may be implemented by software using a processor, or may be implemented by a logic circuit (hardware) formed in an integrated circuit or the like. When a processor is used, the processor reads and executes a program stored in a memory to perform various type of processing. For example, a central processing unit (CPU) is used as a processor. The memory is implemented by one or more storage media such as a read only memory (ROM) and a random access memory (RAM), depending on an application.

As shown in FIG. 2, when the electronic gauge 11 and the joystick 15 are switched to the setting mode, a setting operation of the control parameters is allocated according to the steering pattern. When the steering pattern is the turning steering, the twisting operation of the joystick 15 becomes the basic operation (see FIG. 3A). During the twisting operation of the joystick 15, the input of the forward thrust parameter is allocated to the electronic gauge 11 and the input of the reverse thrust parameter is allocated to the joystick 15. The tilting operation of the joystick 15 in a front-rear direction is invalid as the steering of the ship, and is valid as an input operation of the reverse thrust parameter.

During the twisting operation of the joystick 15, if an up button 13a of the electronic gauge 11 is pressed, the forward thrust parameter is increased by one stage, and if a down button 13b of the electronic gauge 11 is pressed, the forward thrust parameter is decreased by one stage. During the twisting operation of the joystick 15, if the joystick 15 is tilted rearward and returned, the reverse thrust parameter is increased by one stage, and if the joystick 15 is tilted forward and returned, the reverse thrust parameter is decreased by one stage. The forward thrust parameter and the reverse thrust parameter can be simultaneously set while the joystick is being twisted.

In this way, when the turning steering is set, by operating the electronic gauge 11 while twisting the joystick 15, the input of the forward thrust parameter is received, and by tilting the joystick 15 forward and rearward while twisting the joystick 15, the input of the reverse thrust parameter is received. If the twisting operation of the joystick 15 is canceled during the setting mode and the joystick 15 is tilted forward and rearward from a neutral state, as in the normal mode, the thrusts of the propulsors 2L and 2R are output according to the operation amount of the joystick 15. Accordingly, approaching other ships and obstacles can be quickly avoided even in the setting mode.

As shown in FIG. 3A, in a clockwise turning steering, the left propulsor 2L outputs the forward thrust, and the right propulsor 2R outputs the reverse thrust. In order to turn the hull without moving the hull forward and rearward by twisting the joystick 15 clockwise, it is necessary to set the forward thrust parameter of the propulsor 2L and the reverse thrust parameter of the propulsor 2R so that the forward thrust of the propulsor 2L and the reverse thrust of the propulsor 2R are balanced. In this case, since the action during the turning steering differs according to specifications of the hull, the forward thrust parameter and the reverse thrust parameter are set while confirming the action of the hull.

As shown in FIG. 3B, when the hull turns clockwise while moving forward, it is necessary to reduce the forward thrust of the propulsor 2L or increase the reverse thrust of the propulsor 2R. Therefore, while the joystick 15 is twisted, the forward thrust parameter is decreased by pressing the down button 13b of the electronic gauge 11, or the reverse thrust parameter is increased by tilting the joystick 15 rearward. Which of the electronic gauge 11 and the joystick 15 is used is appropriately selected according to a turning speed of the hull. For example, if the turning speed of the hull is too high, the electronic gauge 11 decreases the forward thrust parameter to adjust the turning speed.

As shown in FIG. 3C, when the hull turns clockwise while moving rearward, it is necessary to increase the forward thrust of the propulsor 2L or decrease the reverse thrust of the propulsor 2R. Therefore, while the joystick 15 is twisted, the forward thrust parameter is increased by pressing the up button 13a of the electronic gauge 11, or the reverse thrust parameter is decreased by tilting the joystick 15 forward. Which of the electronic gauge 11 and the joystick 15 is used is appropriately selected according to the turning speed of the hull. For example, if the turning speed of the hull is too high, the joystick 15 decreases the reverse thrust parameter to adjust the turning speed.

Figure 4A:
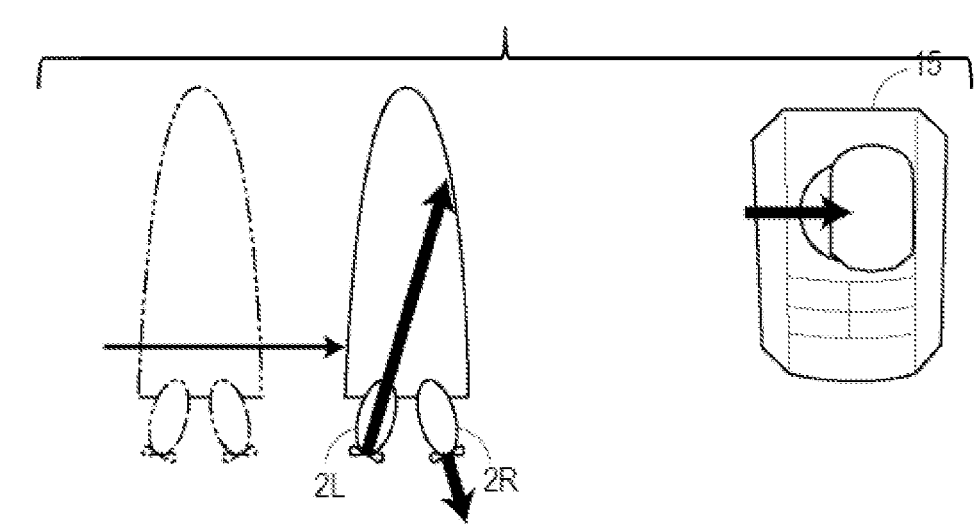
FIGS. 4A, 4B and 4C are diagrams illustrating an initial setting work of a lateral movement steering in the present embodiment.

Returning to FIG. 2, when the steering pattern is the lateral movement steering, the tilting operation of the joystick 15 in the left-right direction becomes the basic operation (see FIG. 4A). During the tilting operation of the joystick 15 in the left-right direction, the input of the forward thrust parameter is allocated to the electronic gauge 11, and the input of the reverse thrust parameter and the input of the rudder angle parameters are allocated to the joystick 15. The tilting operation of the joystick 15 in the front-rear direction is invalid as the steering of the ship, and is valid as the input operation of the reverse thrust parameter. In addition, the twisting operation of the joystick 15 is invalid as the steering of the ship, and is valid as the input operation of the rudder angle parameters.

During the tilting operation of the joystick 15 in the left-right direction, if the up button 13*a* of the electronic gauge 11 is pressed, the forward thrust parameter is increased by one stage, and if the down button 13*b* of the electronic gauge 11 is pressed, the forward thrust parameter is decreased by one stage. During the tilting operation of the joystick 15 in the left-right direction, if the joystick 15 is tilted rearward and returned, the reverse thrust parameter is increased by one stage, and if the joystick 15 is tilted forward and returned, the reverse thrust parameter is decreased by one stage. The forward thrust parameter and the reverse thrust parameter can be simultaneously set while the joystick 15 is being tilted leftward and rightward.

During the rightward tilting operation of the joystick 15, if the joystick 15 is twisted leftward and returned, the rudder angle parameter is increased by one stage (opened), and if the joystick 15 is twisted rightward and returned, the rudder angle parameter is decreased by one stage (closed). During the leftward tilting operation of the joystick 15, if the joystick 15 is twisted rightward and returned, the rudder angle parameter is increased by one stage, and if the joystick 15 is twisted leftward and returned, the rudder angle parameter is decreased by one stage (closed). That is, if the joystick 15 is twisted to a side opposite to the tilted side, the rudder angle parameters are increased, and if the joystick 15 is twisted to the same side as the tilted side, the rudder angle parameters are decreased.

In this way, when the lateral movement steering is set, by operating the electronic gauge 11 while twisting the joystick 15 leftward and rightward, the input of the forward thrust parameter is received, and by tilting the joystick 15 forward and rearward while tilting the joystick 15 leftward and rightward, the input of the reverse thrust parameter is received. Furthermore, by twisting the joystick 15 while tilting the joystick 15 leftward and rightward, the input of the rudder angle parameters is received. When the tilting operation of the joystick in the left-right direction is canceled during the setting mode and the joystick 15 is tilted forward and rearward from the neutral state, as in the normal mode, the thrusts of the propulsors 2L and 2R are output according to the operation amount of the joystick 15.

As shown in FIG. 4A, in a rightward lateral movement steering, the left and right propulsors 2L and 2R are opened to the left and right in an inverted V shape, the left propulsor 2L outputs the forward thrust, and the right propulsor 2R outputs the reverse thrust. In order to laterally move the hull without moving the hull forward and rearward by tilting the joystick 15 rightward, it is necessary to set the forward thrust parameter of the propulsor 2L and the reverse thrust parameter of the propulsor 2R so that the forward thrust of the propulsor 2L and the reverse thrust of the propulsor 2R are balanced. In this case, since the action during the lateral movement steering differs according to the specifications of the hull, the forward thrust parameter and the reverse thrust parameter are set while confirming the action of the hull.

Figure 4B:
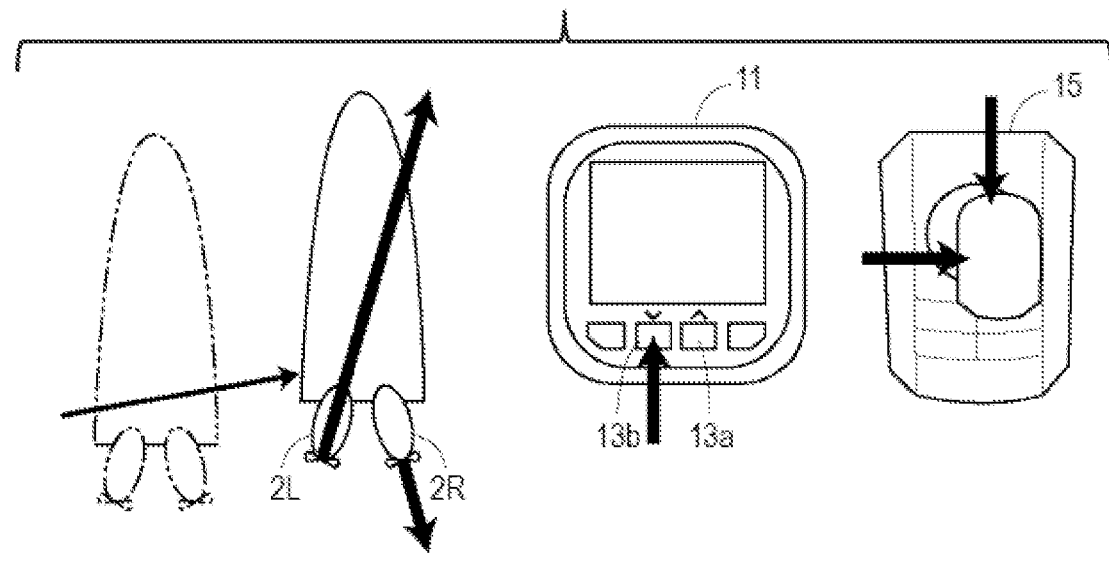

As shown in FIG. 4B, when the hull moves obliquely forward to the right, it is necessary to reduce the forward thrust of the propulsor 2L or increase the reverse thrust of the propulsor 2R. Therefore, while the joystick 15 is tilted rightward, the forward thrust parameter is decreased by pressing the down button 13*b* of the electronic gauge 11, or the reverse thrust parameter is increased by tilting the joystick 15 rearward. Which of the electronic gauge 11 and the joystick 15 is used is appropriately selected according to a lateral movement speed of the hull. For example, if the lateral movement speed of the hull is too high, the electronic gauge 11 decreases the forward thrust parameter to adjust the turning speed.

Figure 4C:
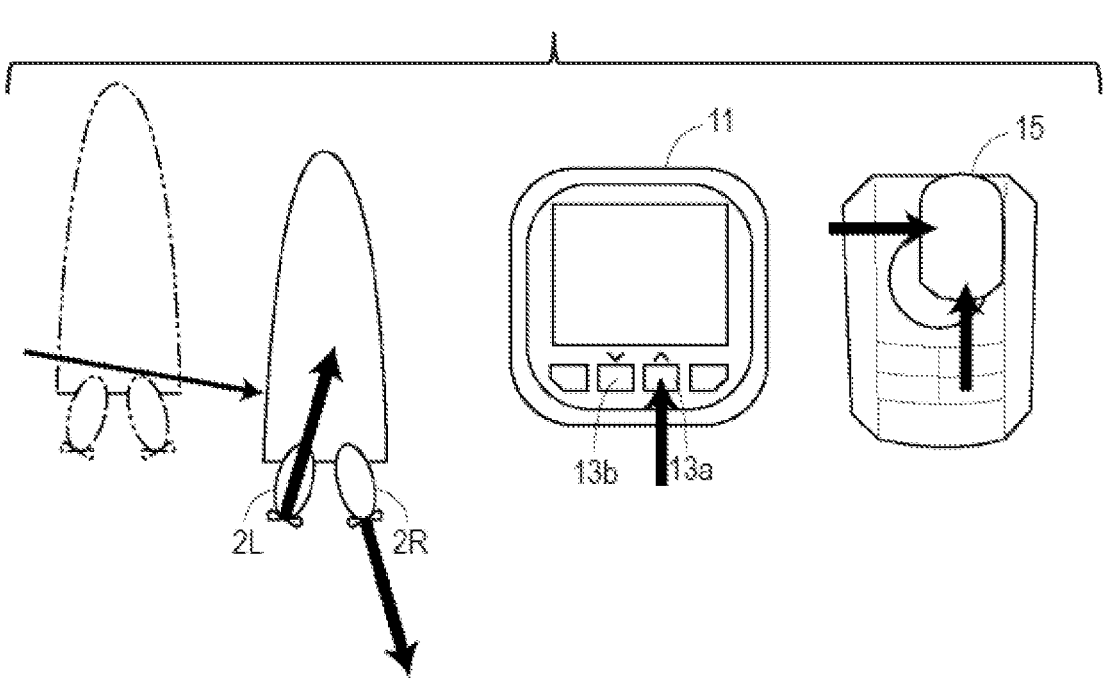

As shown in FIG. 4C, when the hull moves obliquely rearward to the right, it is necessary to increase the forward thrust of the propulsor 2L or reduce the reverse thrust of the propulsor 2R. Therefore, while the joystick 15 is tilted rightward, the forward thrust parameter is increased by pressing the up button 13*a* of the electronic gauge 11, or the reverse thrust parameter is decreased by tilting the joystick 15 forward. Which of the electronic gauge 11 and the joystick 15 is used is appropriately selected according to the lateral movement speed of the hull. For example, if the lateral movement speed of the hull is too high, the joystick 15 decreases the reverse thrust parameter to adjust the turning speed.

Figure 5A:
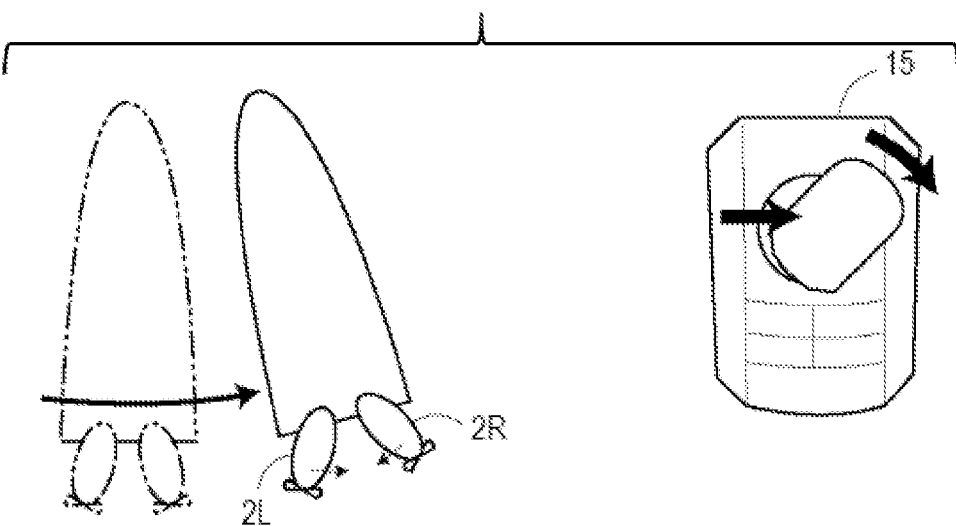
FIGS. 5A and 5B are diagrams illustrating the initial setting work of the lateral movement steering in the present embodiment.
Figure 5B:
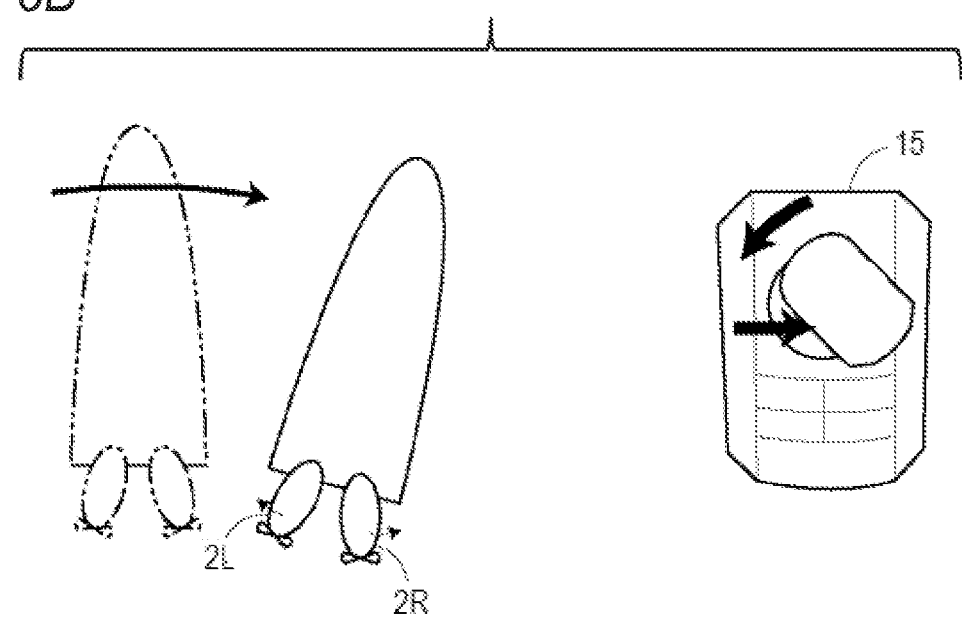

As shown in FIG. 5A, when the hull moves rightward while swinging a stern, it is necessary to close (narrow) the rudder angles of the propulsors 2L and 2R. Therefore, while the joystick 15 is tilted rightward, the rudder angle parameters are decreased by twisting the joystick 15 rightward. As shown in FIG. 5B, when the hull moves rightward while swinging a bow, it is necessary to open (widen) the rudder angles of the propulsors 2L and 2R. Therefore, while the joystick 15 is tilted rightward, the rudder angle parameters are increased by twisting the joystick 15 leftward.

By the way, during the steering of the ship in the normal mode, the outputs of the propulsors 2L and 2R change according to the operation amount of the joystick 15. On the other hand, when the steering pattern is set in the setting mode, regardless of the operation amount of the joystick 15, the forward thrust and the reverse thrust are adjusted based on a constant output of the propulsors 2L and 2R. The upper limit output of the propulsors 2L and 2R is set by the electronic gauge 11 to the two stages, large and small, and the forward thrust and the reverse thrust of the propulsors 2L and 2R are adjusted based on the forward thrust parameter and the reverse thrust parameter that indicate the ratios to the upper limit output. Accordingly, it is possible to concentrate on setting the steering pattern without being conscious of the operation amount of the joystick 15.

As shown in FIG. 6, when the steering pattern is the turning steering, the electronic gauge 11 sets the upper limit output to the two stages, large and small, for the twisting operation of the joystick 15. If the upper limit output is set to "small", regardless of the operation amount in a twisting direction of the joystick 15, the forward thrust and the reverse thrust of the propulsors 2L and 2R are adjusted based on the respective thrust parameters with the upper limit output "small" as a reference. If the upper limit output is set to "large", regardless of the operation amount in the twisting direction of the joystick 15, the forward thrust and the reverse thrust of the propulsors 2L and 2R are adjusted based on each thrust parameter with the upper limit output "large" as a reference.

When the steering pattern is the lateral movement steering, the electronic gauge 11 sets the upper limit output to the two stages, large and small, for the tilting operation of the joystick 15 in the left-right direction. If the upper limit output is set to "small", regardless of the operation amount in a tilting direction of the joystick 15, the forward thrust and the reverse thrust of the propulsors 2L and 2R are adjusted based on the respective thrust parameters with the upper limit output "small" as a reference. If the upper limit output is set to "large", regardless of the operation amount in the tilting direction of the joystick 15, the forward thrust and the reverse thrust of the propulsors 2L and 2R are adjusted based on the respective thrust parameters with the upper limit output "large" as a reference.

Figure 7:
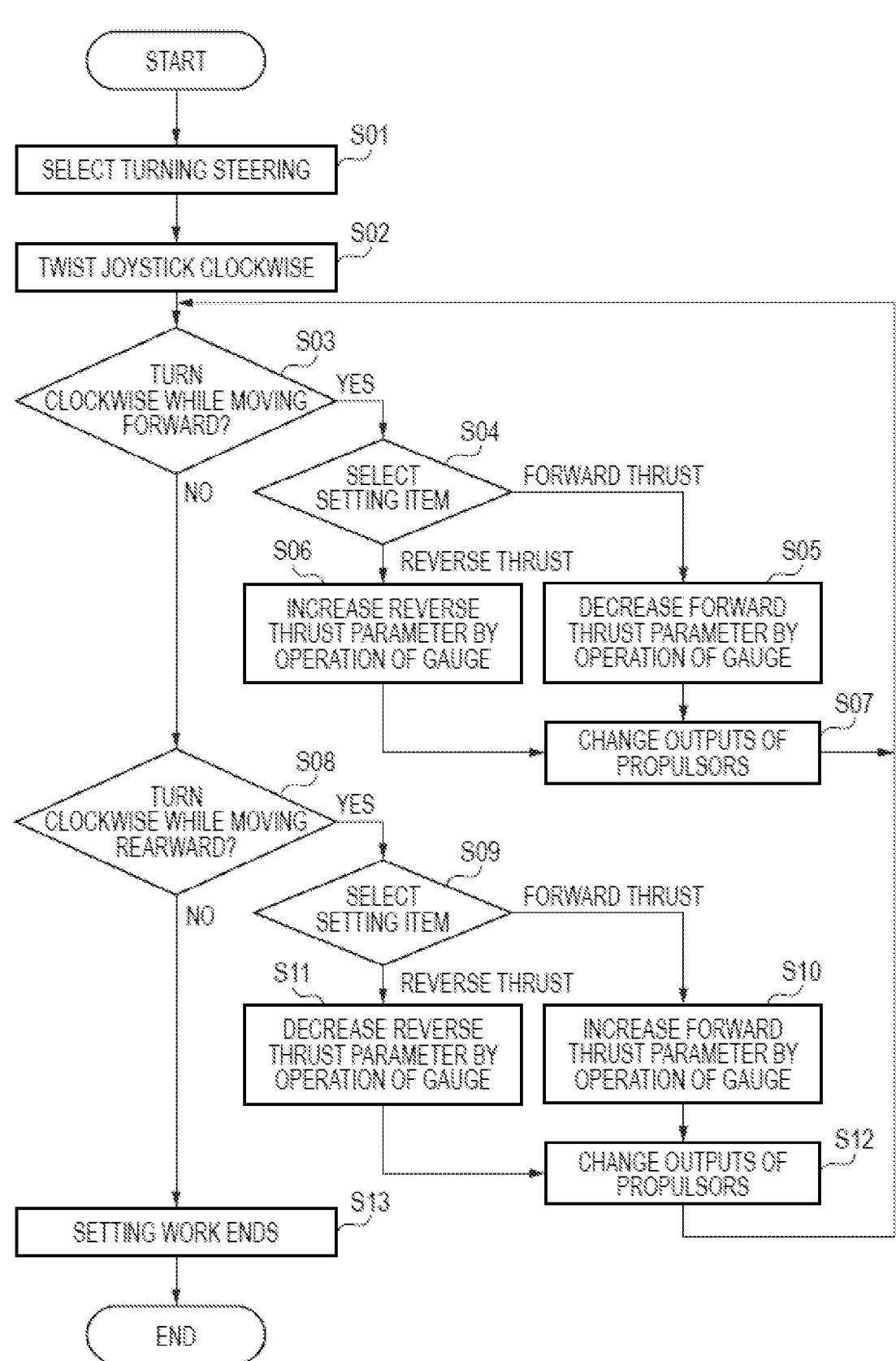
FIG. 7 is a flowchart showing a setting motion of a turning steering in Comparative Example.
Figure 8:
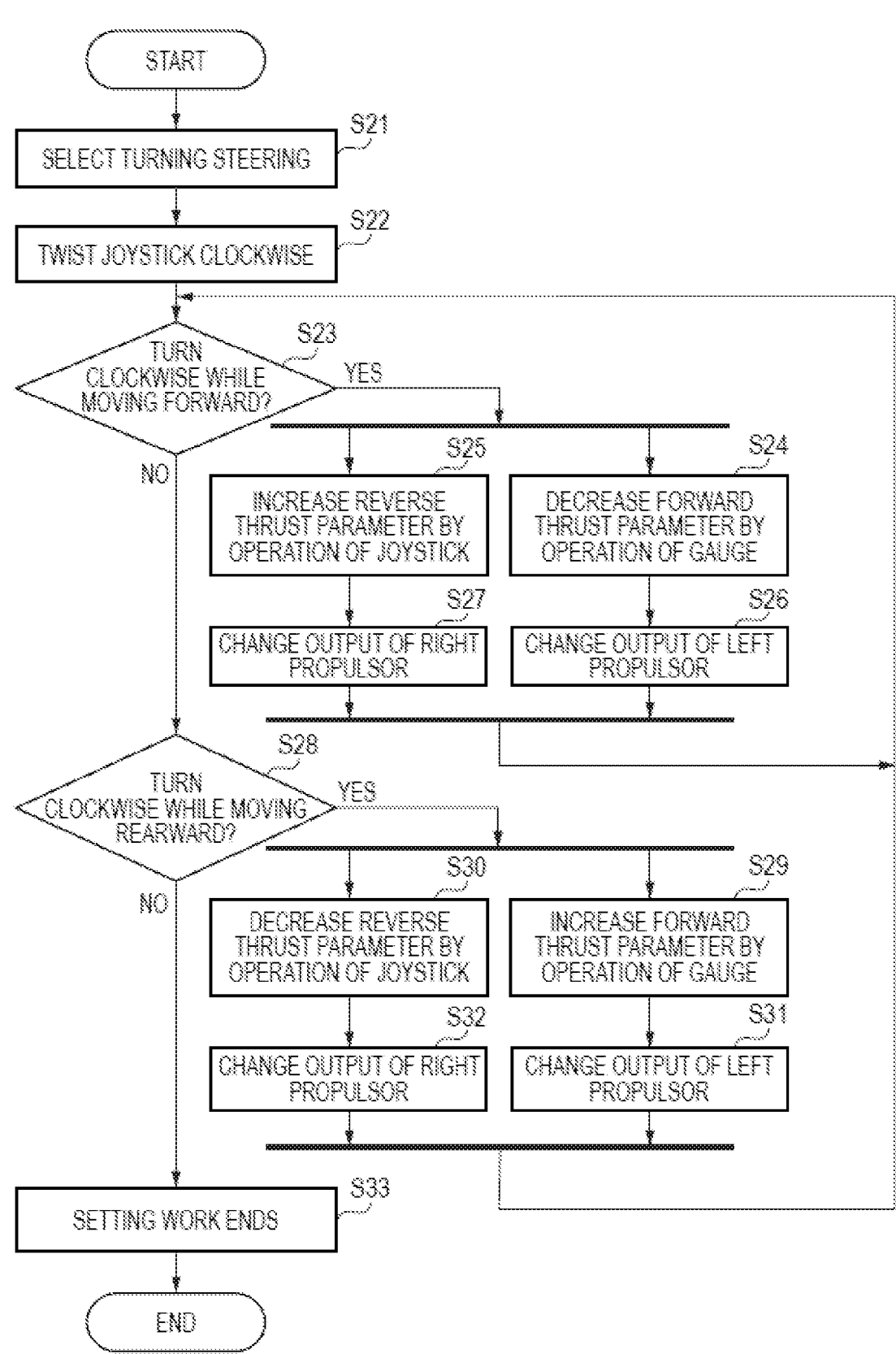
FIG. 8 is a flowchart showing a setting motion of the turning steering in the present embodiment.
Figure 9:
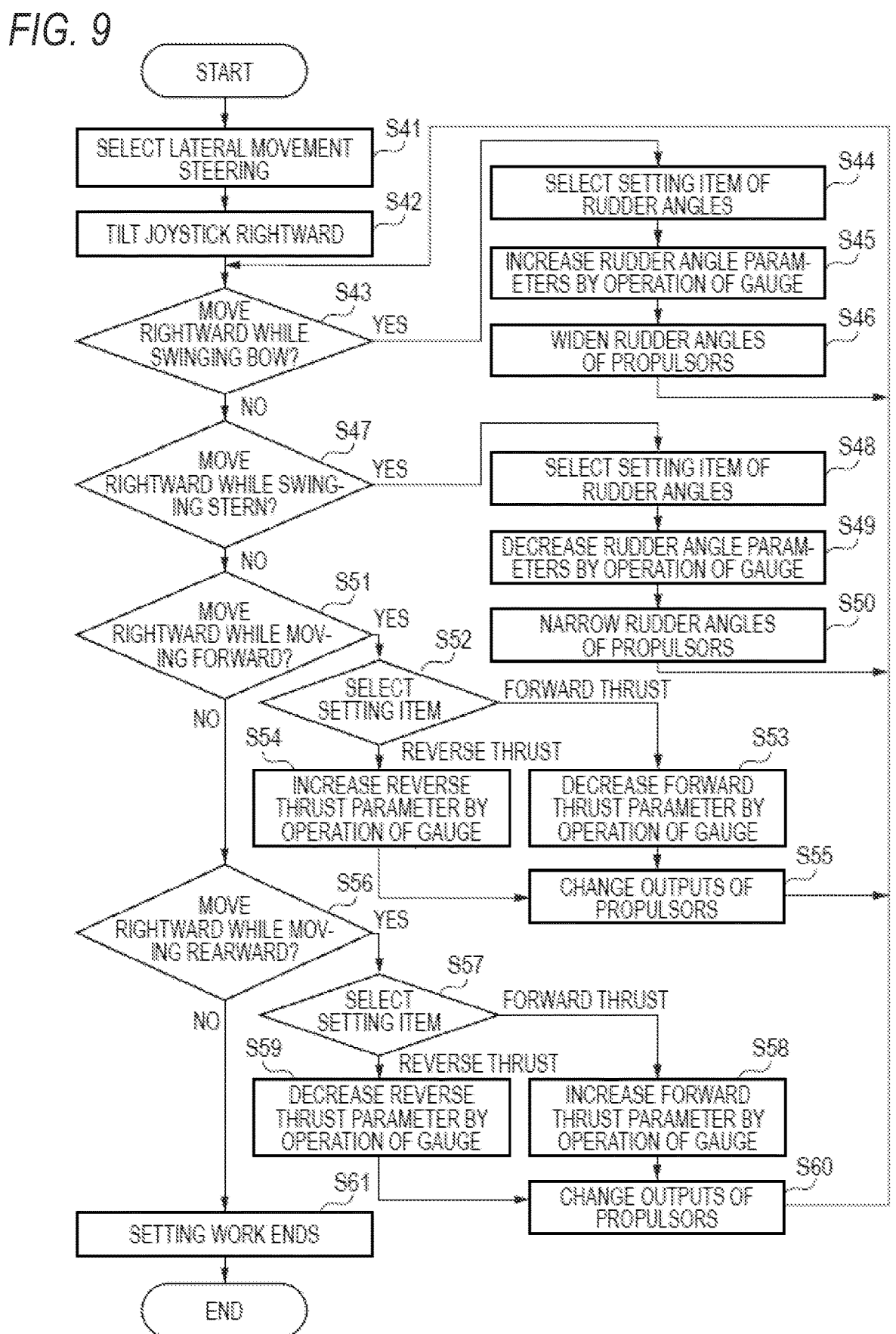
FIG. 9 is a flowchart showing a setting motion of a lateral movement steering in Comparative Example.
Figure 10:
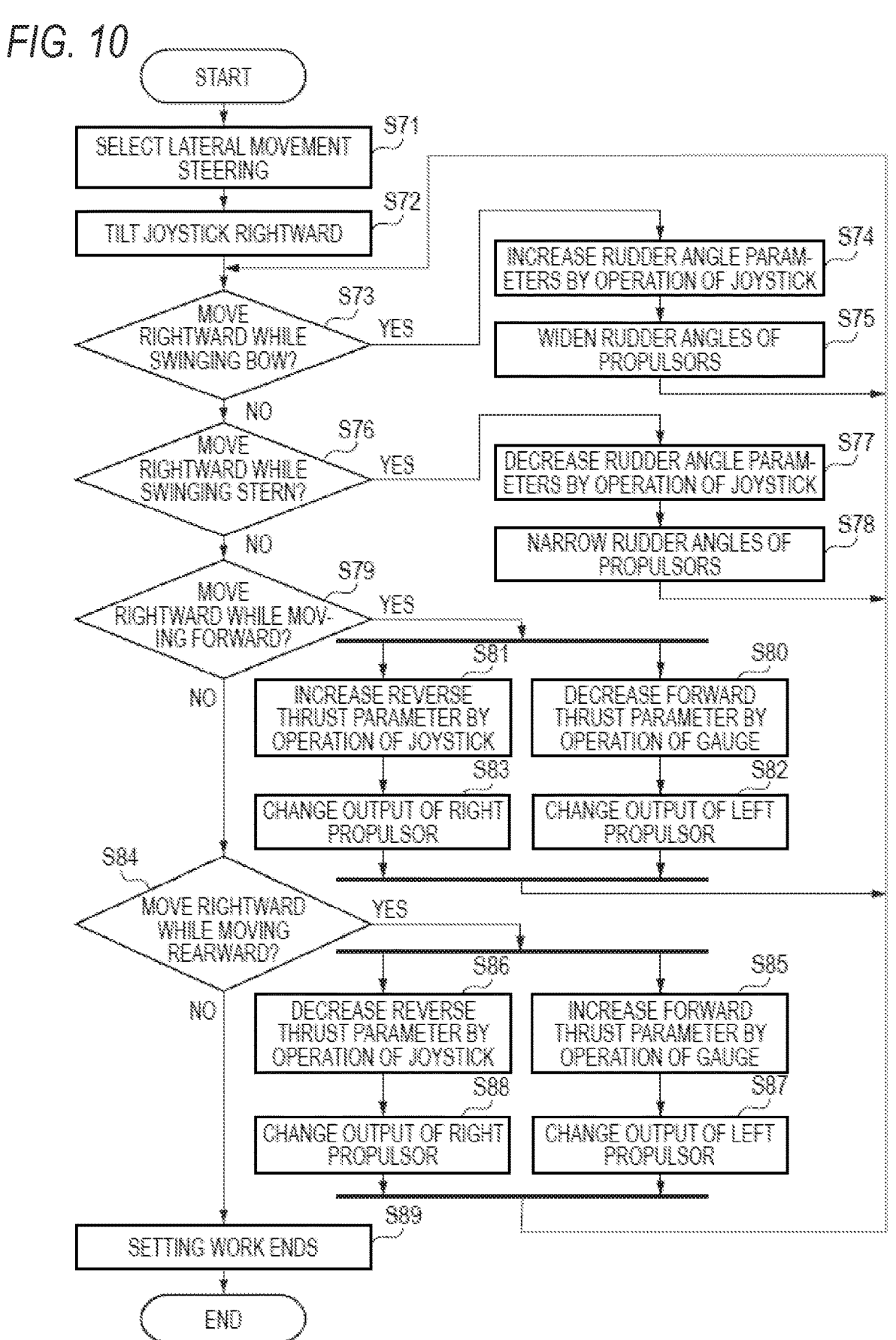
FIG. 10 is a flowchart showing a setting motion of the lateral movement steering in the present embodiment.

Setting motions for turning steerings and setting motions for lateral movement steerings will be described with reference to each of FIGS. 7 to 10. FIG. 7 is a flowchart showing the setting motion for the turning steering in Comparative Example. FIG. 8 is a flowchart showing the setting motion of the turning steering in the present embodiment. FIG. 9 is a flowchart showing the setting motion for the lateral movement steering in Comparative Example. FIG. 10 is a flowchart showing the setting motion for the lateral movement steering in the present embodiment. A setting motion for a steering pattern in Comparative Example differs from the setting motion for the steering pattern in the present embodiment in that the forward thrust, the reverse thrust, and the rudder angles are set by using a single electronic gauge.

As shown in FIG. 7, in the initial setting for the clockwise turning steering in Comparative Example, the turning steering is selected in the setting mode (step S01), and the joystick is twisted clockwise (step S02). If the hull turns clockwise while moving forward (Yes in step S03), a setting item of the forward thrust or the reverse thrust is selected by the electronic gauge (step S04). If the setting item of the forward thrust is selected, the forward thrust parameter is decreased by the input operation of the electronic gauge (step S05). If the setting item of the reverse thrust is selected, the reverse thrust parameter is increased by the input operation of the electronic gauge (step S06). The outputs of the left and right propulsors are changed according to the forward thrust parameter or the reverse thrust parameter (step S07).

If the hull turns clockwise while moving rearward (Yes in step S08), the setting item of the forward thrust or the reverse thrust is selected by the electronic gauge (step S09). If the setting item of the forward thrust is selected, the forward thrust parameter is increased by the input operation of the electronic gauge (step S10). If the setting item of the reverse thrust is selected, the reverse thrust parameter is decreased by the input operation of the electronic gauge (step S11). The outputs of the left and right propulsors are changed according to the forward thrust parameter or the reverse thrust parameter (step S12). In steps S04 and S09, the setting item of the forward thrust or reverse thrust is appropriately selected according to the turning speed of the hull.

The processing from step S03 to step S12 is repeated until the hull stops moving forward or rearward during the turning steering. If the hull does not change the position thereof and turns clockwise (No in step S03 and No in step S08), the setting work of the turning steering in the setting mode ends (step S13). In the initial setting for the turning steering in Comparative Example, only one setting item can be selected by the electronic gauge in steps S04 and S09. Therefore, it is necessary to set the forward thrust and the reverse thrust separately, and it takes time to set the thrust depending on the action of the hull. Since the joystick is operated with one hand, complicated by operation of gauges such as changing the setting item must be performed with the other hand.

In this regard, as shown in FIG. 8, in the initial setting for the clockwise turning steering in the present embodiment, the turning steering is selected in the setting mode (step S21), and the joystick 15 is twisted clockwise (step S22). If the hull turns clockwise while moving forward (Yes in step S23), the input operation of the forward thrust parameter performed by the electronic gauge 11 and the input operation of the reverse thrust parameter performed by the joystick 15 are performed in parallel. The forward thrust parameter is decreased by the input operation of the electronic gauge 11 (step S24), and the joystick 15 is tilted rearward and the reverse thrust parameter is increased (step S25). The output of the propulsor 2L is changed according to the forward thrust parameter (step S26), and the output of the propulsor 2R is changed according to the reverse thrust parameter (step S27).

If the hull turns clockwise while moving rearward (Yes in step S28), the input operation of the forward thrust parameter performed by the electronic gauge 11 and the input operation of the reverse thrust parameter performed by the joystick 15 are performed in parallel. The forward thrust parameter is increased by the input operation of the electronic gauge 11 (step S29), and the joystick 15 is tilted forward and the reverse thrust parameter is decreased (step S30). The output of the propulsor 2L is changed according to the forward thrust parameter (step S31), and the output of the propulsor 2R is changed according to the reverse thrust parameter (step S32). The input operation of the electronic gauge 11 or the input operation of the joystick 15 in steps S24, S25, S29, and S30 is appropriately performed according to the turning speed of the hull.

The processing from step S23 to step S32 is repeated until the hull stops moving forward or rearward during the turning steering. If the hull does not change the position thereof and turns clockwise (No in step S23 and No in step S28), the setting work of the turning steering in the setting mode ends (step S33). In the initial setting for the turning steering in the present embodiment, the input operations of the forward thrust parameter and the reverse thrust parameter are allocated to the electronic gauge 11 and the joystick 15. Therefore, the forward thrust parameter and the reverse thrust parameter can be simultaneously set while confirming the action of the ship, so that the work load of the setting work is reduced and the work time is shortened. By twisting the joystick 15 and tilting the joystick 15 forward and rearward, the thrusts can be set intuitively.

As shown in FIG. 9, in the rightward lateral movement steering in Comparative Example, the lateral movement steering is selected in the setting mode (step S41), and the joystick is tilted rightward (step S42). If the hull moves rightward while swinging the bow (Yes in step S43), the setting item of the rudder angles is selected by the electronic gauge (step S44). The rudder angle parameters are increased by the input operation of the electronic gauge (step S45), and the rudder angles of the left and right propulsors are widened (step S46). If the hull moves rightward while swinging the stern (Yes in step S47), the setting item of the rudder angles is selected by the electronic gauge (step S48). The rudder angle parameter is decreased by the input operation of the electronic gauge (step S49), and the rudder angles of the left and right propulsors are narrowed (step S50).

The processing from step S43 to step S50 is repeated until the swinging of the bow or stern of the hull stops during the lateral movement steering. If the hull moves rightward while moving forward (Yes in step S51), the setting item of the forward thrust or the reverse thrust is selected by the electronic gauge (step S52). If the setting item of the forward thrust is selected, the forward thrust parameter is decreased by the input operation of the electronic gauge (step S53). If the setting item of the reverse thrust is selected, the reverse thrust parameter is increased by the input operation of the electronic gauge (step S54). The outputs of the left and right propulsors are changed according to the forward thrust parameter or the reverse thrust parameter (step S55).

If the hull moves rightward while moving rearward (Yes in step S56), the setting item of the forward thrust or the reverse thrust is selected by the electronic gauge (step S57). If the setting item of the forward thrust is selected, the forward thrust parameter is increased by the input operation of the electronic gauge (step S58). If the setting item of the reverse thrust is selected, the reverse thrust parameter is decreased by the input operation of the electronic gauge (step S59). The outputs of the left and right propulsors are changed according to the forward thrust parameter or the reverse thrust parameter (step S60). In steps S52 and S57, the setting item of the forward thrust or reverse thrust is appropriately selected according to the lateral movement speed of the hull.

The processing from step S43 to step S60 is repeated until the hull stops moving forward or rearward during the lateral movement steering. If the hull moves rightward without moving forward or rearward (No in step S51 and No in step S56), the setting work on the lateral movement steering in the setting mode ends (step S61). In the initial setting for the lateral movement steering in Comparative Example, only one setting item can be selected by the electronic gauge in steps S52 and S57. Therefore, it is necessary to set the forward thrust and the reverse thrust separately, and it takes time to set the thrust depending on the action of the hull. Since the joystick is operated with one hand, complicated operations of the gauge, such as changing the setting item, must be performed with the other hand.

On the other hand, as shown in FIG. 10, in the rightward lateral movement steering in the present embodiment, the lateral movement steering is selected in the setting mode (step S71), and the joystick 15 is tilted rightward (step S72). If the hull moves rightward while swinging the bow (Yes in step S73), the joystick 15 is twisted leftward and the rudder angle parameters are increased (step S74) and the rudder angles of the propulsors 2L and 2R are widened (step S75). If the hull moves rightward while swinging the stern (Yes in step S76), the joystick 15 is twisted rightward and the rudder angle parameters are decreased (step S77) and the rudder angles of the propulsors 2L and 2R are narrowed (step S78).

The processing from steps S73 to S78 is repeated until the swinging of the bow or stern of the hull stops during the lateral movement steering. If the hull moves rightward while moving forward (Yes in step S79), the input operation of the forward thrust parameter performed by the electronic gauge 11 and the input operation of the reverse thrust parameter performed by the joystick 15 are performed in parallel. The forward thrust parameter is decreased by the input operation of the electronic gauge 11 (step S80), and the joystick 15 is tilted rearward and the reverse thrust parameter is increased (step S81). The output of the propulsor 2L is changed according to the forward thrust parameter (step S82), and the output of the propulsor 2R is changed according to the reverse thrust parameter (step S83).

If the hull moves rightward while moving rearward (Yes in step S84), the input operation of the forward thrust parameter performed by the electronic gauge 11 and the input operation of the reverse thrust parameter performed by the joystick 15 are performed in parallel. The forward thrust parameter is increased by the input operation of the elec-tronic gauge 11 (step S85), and the joystick 15 is tilted forward and the reverse thrust parameter is decreased (step S86). The output of the propulsor 2L is changed according to the forward thrust parameter (step S87), and the output of the propulsor 2R is changed according to the reverse thrust parameter (step S88). The input operation of the electronic gauge 11 or the input operation of the joystick 15 in step S80, S81, S85, or S86 is appropriately performed according to the lateral movement speed of the hull.

The processing from steps S73 to S88 is repeated until the hull stops moving forward or rearward during the lateral movement steering. If the hull moves rightward without moving forward or rearward (No in step S79 and No in step S84), the setting work of the lateral movement steering in the setting mode ends (step S89). In the initial setting for the lateral movement steering in the present embodiment, the input operations of the forward thrust parameter and the reverse thrust parameter are allocated to the electronic gauge 11 and the joystick 15. Therefore, the forward thrust param-eter and the reverse thrust parameter can be simultaneously set while confirming the action of the ship, so that the work load of the setting work is reduced and the work time is shortened. By tilting the joystick 15 leftward and rightward and tilting the joystick 15 forward and rearward, the thrusts can be intuitively set to increase or decrease, and the opening and closing of the rudder angles can be intuitively set by twisting the joystick 15 while tilting the joystick 15 leftward and rightward.

As described above, according to the steering system 1 for the ship according to the present embodiment, the forward thrust parameter and the reverse thrust parameter are input in parallel by the electronic gauge 11 and the joystick 15 when the steering pattern is set, and the forward thrust parameter and the reverse thrust parameter are reflected in the propulsors 2L and 2R in real time. The forward thrust parameter and the reverse thrust parameter can be simulta-neously set while confirming the action of the ship. There-fore, it is possible to reduce the work loads of the setting works on the forward thrust parameter and the reverse thrust parameter, and shorten the work times.

In the present embodiment, the forward thrust parameter is input by the electronic gauge and the reverse thrust parameter is input by the joystick, but the reverse thrust parameter may be input by the electronic gauge and the forward thrust parameter may be input by the joystick.

In the present embodiment, the configuration in which the first input device is the electronic gauge has been described, but the first input device may be any device that receives the input of any one of the forward thrust parameter and the reverse thrust parameter of the propulsors.

In the present embodiment, the configuration in which the second input device is the joystick has been described, but the second input device may be any device that receives the input of any one of the forward thrust parameter and the reverse thrust parameter of the propulsors. For example, the steering system may be provided with two input devices in addition to the joystick.

In the present embodiment, the configuration in which the controller includes the steering ECU and the remote con-troller ECU has been described, but the controller may be any controller that reflects the forward thrust parameter and the reverse thrust parameter in the propulsors in real time.

In the present embodiment, the propulsor may be an outboard motor, an inboard outboard motor, or an inboard motor.

In the present embodiment, various parameters are input by the tilting operation or twisting operation of the joystick, but various parameters may be input by operation buttons provided on the joystick.

In the present embodiment, a setting content of the steering pattern may be uploaded to an external server or the like, or may be stored in an external recording medium or the like. Accordingly, it is possible to reflect the setting content of the steering pattern on ships of the same type.

As described above, a first aspect is a steering system (1) of a ship to which left and right propulsors (2L and 2R) are attached, including: a first input device (electronic gauge 11) configured to receive an input of any one of a forward thrust parameter and a reverse thrust parameter of the propulsors; a second input device (joystick 15) configured to receive an input of the other of the forward thrust parameter and the reverse thrust parameter of the propulsors; and a controller (remote controller ECU 17) configured to reflect the forward thrust parameter and the reverse thrust parameter to the propulsors in real time, in which the first input device and the second input device receive the inputs in parallel when a steering pattern is set. According to this configuration, the forward thrust parameter and the reverse thrust parameter are input in parallel by the first and second input devices when the steering pattern is set, and the forward thrust parameter and the reverse thrust parameter are reflected in the propulsors in real time. The forward thrust parameter and the reverse thrust parameter can be simultaneously set while confirming an action of the ship. Therefore, it is possible to reduce work loads of setting works on the forward thrust parameter and the reverse thrust parameter, and shorten work times.

In a second aspect according to the first aspect, the second input device receives an input of rudder angle parameters of the propulsors, and the controller (steering ECU 16) reflects the rudder angle parameters in the propulsors in real time. According to this configuration, the rudder angle parameters can be set while confirming the action of the ship.

In a third aspect according to the first aspect or the second aspect, the first input device is a gauge configured to display the forward thrust parameter and the reverse thrust parameter. According to this configuration, the forward thrust parameter and the reverse thrust parameter can be confirmed in real time by viewing the gauge. There is no need to prepare a dedicated display device.

In a fourth aspect according to any one of the first aspect to the third aspect, the second input device is a joystick. According to this configuration, the number of components can be reduced by using the joystick as the second input device. The forward thrust parameter or the reverse thrust parameter can be set during a steering of a ship without removing a hand from the joystick.

In a fifth aspect according to the fourth aspect, the steering pattern is a turning steering, by operating the first input device while twisting the joystick when the turning steering is set, the first input device receives the input of any one of the forward thrust parameter and the reverse thrust parameter, and by tilting the joystick forward and rearward while twisting the joystick when the turning steering is set, the joystick receives the input of the other of the forward thrust parameter and the reverse thrust parameter. According to this configuration, the forward thrust parameter or the reverse thrust parameter can be input by an operation different from a steering operation of a ship performed by the joystick. By tilting the joystick forward and rearward while twisting the joystick, the thrust can be intuitively set to increase or decrease.

In a sixth aspect according to the fourth aspect or the fifth aspect, the steering pattern is a lateral movement steering, by operating the first input device while twisting the joystick leftward and rightward when the lateral movement steering is set, the first input device receives the input of any one of the forward thrust parameter and the reverse thrust parameter, and by tilting the joystick forward and rearward while tilting the joystick leftward and rightward when the lateral movement steering is set, the joystick receives the input of the other of the forward thrust parameter and the reverse thrust parameter. According to this configuration, the forward thrust parameter or the reverse thrust parameter can be input by an operation different from the steering operation performed by the joystick. By tilting the joystick forward and rearward while tilting the joystick leftward and rightward, thrusts can be intuitively set to increase or decrease.

In a seventh aspect according to any one aspect of the fourth aspect to the sixth aspect, when the steering pattern is set, regardless of an operation amount of the joystick, a forward thrust and a reverse thrust are adjusted based on constant outputs of the propulsors. According to this configuration, it is possible to concentrate on setting the steering pattern without being conscious of the operation amount of the joystick.

In an eighth aspect according to any one aspect of the fourth aspect to the seventh aspect, the steering pattern is ship lateral movement, and an input of a rudder angle parameter is received by twisting the joystick while tilting the joystick leftward or rightward when the lateral movement steering is set. According to this configuration, the rudder angle parameter can be input by an operation different from the steering operation performed by the joystick. By twisting the joystick while tilting the joystick leftward or rightward, it is possible to intuitively set opening and closing of rudder angles.

In a ninth aspect according to any one aspect of the fourth aspect to the seventh aspect, if the joystick tilts forward and rearward from a neutral state when the steering pattern is set, thrusts of the propulsors are output according to an operation amount of the joystick. According to this configuration, approaching other ships and obstacles can be quickly avoided even when the steering pattern is set.

A tenth aspect is a control parameter setting method for a ship to which left and right propulsors are attached, including: a step of receiving an input of any one of a forward thrust parameter and a reverse thrust parameter of the propulsors by a first input device when a steering pattern of a ship is set, and receiving an input of the other of the forward thrust parameter and the reverse thrust parameter by a second input device in parallel with the input by the first input device; and a step of reflecting the forward thrust parameter and the reverse thrust parameter in the propulsors in real time. According to this configuration, the forward thrust parameter and the reverse thrust parameter are input in parallel by the first and second input devices when the steering pattern is set, and the forward thrust parameter and the reverse thrust parameter are reflected in the propulsors in real time. The forward thrust parameter and the reverse thrust parameter can be simultaneously set while confirming an action of the ship. Therefore, it is possible to reduce work loads of setting works on the forward thrust parameter and the reverse thrust parameter, and shorten work times.

In an eleventh aspect according to the tenth aspect, in the step of receiving the inputs, an input of rudder angle parameters of the propulsors is received by the second input device, and in the step of reflecting in the propulsors, the rudder angle parameters are reflected in the propulsors in real time. According to this configuration, the rudder angle parameters can be set while confirming the action of the ship.

Although the present embodiment has been described, the above-described embodiment and the modification may be combined entirely or partially as another embodiment.

The technique of the present invention is not limited to the above-described embodiment, and various changes, substitutions and modifications may be made without departing from the spirit of the technical idea of the present invention. The present invention may be implemented by other methods as long as the technical concept can be implemented by the methods through advance of the technique or other derivative techniques. Therefore, the claims cover all embodiments that may be included within the scope of the technical concept.

What is claimed is:

1. A steering system for a ship to which left and right propulsors are attached, comprising:

a first input device configured to receive an input of mode change between a normal mode and a setting mode, and to receive an input of any one of a forward thrust parameter and a reverse thrust parameter of the propulsors in the setting mode;

a second input device configured to receive an input of the other of the forward thrust parameter and the reverse thrust parameter of the propulsors in the setting mode; and a controller configured to reflect the forward thrust parameter and the reverse thrust parameter to the propulsors in real time in the setting mode, wherein the first input device and the second input device receive the inputs in parallel when a steering pattern being a turning steering and a lateral movement steering is set in the setting mode, the second input device is a joystick, by operating the first input device while tilting the joystick leftward and rightward when the lateral movement steering is set, the first input device receives the input of any one of the forward thrust parameter and the reverse thrust parameter, and by tilting the joystick forward and rearward while tilting the joystick leftward and rightward when the lateral movement steering is set, the joystick receives the input of the other of the forward thrust parameter and the reverse thrust parameter.

2. The steering system according to claim 1, wherein the second input device receives an input of rudder angle parameters of the propulsors, and the controller reflects the rudder angle parameters in the propulsors in real time.

3. The steering system according to claim 1, wherein the first input device is a gauge configured to display the forward thrust parameter and the reverse thrust parameter.

4. The steering system according to claim 1, wherein when the steering pattern is set, regardless of an operation amount of the joystick, a forward thrust and a reverse thrust are adjusted based on constant outputs of the propulsors.

5. The steering system according to claim 1, wherein an input of a rudder angle parameter is received by twisting the joystick while tilting the joystick leftward or rightward when the lateral movement steering is set.

6. The steering system according to claim 1, wherein if the joystick tilts forward and rearward from a neutral state when the steering pattern is set, thrusts of the propulsors are output according to an operation amount of the joystick.

7. A control parameter setting method for a ship to which left and right propulsors are attached, comprising:

a step of receiving an input of mode change between a normal mode and a setting mode;

in the setting mode, a step of receiving an input of any one of a forward thrust parameter and a reverse thrust parameter of the propulsors by a first input device when a steering pattern being a turning steering and a lateral movement steering for a ship is set, and receiving an input of the other of the forward thrust parameter and the reverse thrust parameter by a second input device in parallel with the input received by the first input device; and in the setting mode, a step of reflecting the forward thrust parameter and the reverse thrust parameter on the propulsors in real time, wherein the second input device is a joystick wherein by operating the first input device while twisting the joystick when the turning steering is set, the first input device receives the input of any one of the forward thrust parameter and the reverse thrust parameter, and wherein by tilting the joystick forward and rearward while twisting the joystick when the turning steering is set, the joystick receives the input of the other of the forward thrust parameter and the reverse thrust parameter.

8. The control parameter setting method according to claim 7, wherein in the step of receiving the inputs, an input of rudder angle parameters of the propulsors is received by the second input device, and in the step of reflecting in the propulsors, the rudder angle parameters are reflected in the propulsors in real time.

9. A steering system for a ship to which left and right propulsors are attached, comprising:

a first input device configured to receive an input of any one of a forward thrust parameter and a reverse thrust parameter of the propulsors;

a second input device configured to receive an input of the other of the forward thrust parameter and the reverse thrust parameter of the propulsors; and a controller configured to reflect the forward thrust parameter and the reverse thrust parameter to the propulsors in real time, wherein the first input device and the second input device receive the inputs in parallel when a steering pattern is set, the second input device is a joystick, the steering pattern is a turning steering, by operating the first input device while twisting the joystick when the turning steering is set, the first input device receives the input of any one of the forward thrust parameter and the reverse thrust parameter, and by tilting the joystick forward and rearward while twisting the joystick when the turning steering is set, the joystick receives the input of the other of the forward thrust parameter and the reverse thrust parameter.

10. The steering system according to claim 9, wherein the second input device receives an input of rudder angle parameters of the propulsors, and the controller reflects the rudder angle parameters in the propulsors in real time.

11. The steering system according to claim 9, wherein the first input device is a gauge configured to display the forward thrust parameter and the reverse thrust parameter.

12. The steering system according to claim 9, wherein when the steering pattern is set, regardless of an operation amount of the joystick, a forward thrust and a reverse thrust are adjusted based on constant outputs of the propulsors.

13. The steering system according to claim 9, wherein an input of a rudder angle parameter is received by twisting the joystick while tilting the joystick leftward or rightward when the lateral movement steering is set.

14. The steering system according to claim 9, wherein if the joystick tilts forward and rearward from a neutral state when the steering pattern is set, thrusts of the propulsors are output according to an operation amount of the joystick.

\* \* \* \* \*